United States Patent
Pire et al.

(10) Patent No.: US 8,527,237 B2
(45) Date of Patent: Sep. 3, 2013

(54) METHOD OF USING TELEMETRY TO DETECT AT LEAST ONE SUSPENDED THREADLIKE OBJECT, THE OBJECT LYING IN THE DETECTION FIELD OF A TELEMETER MOUNTED ON BOARD A VEHICLE

(75) Inventors: Richard Pire, Istres (FR); Marianne Gillet, Vitrolles (FR)

(73) Assignee: Eurocopter, Marignane Cedex (FR)

( * ) Notice: Subject to any disclaimer, the term of this patent is extended or adjusted under 35 U.S.C. 154(b) by 369 days.

(21) Appl. No.: 12/956,366

(22) Filed: Nov. 30, 2010

(65) Prior Publication Data
US 2011/0144942 A1    Jun. 16, 2011

(30) Foreign Application Priority Data
Dec. 2, 2009   (FR) ...................................... 09 05822

(51) Int. Cl.
*G06F 19/00* (2011.01)
(52) U.S. Cl.
USPC ........... 702/152; 340/442; 340/445; 340/447; 356/139.03
(58) Field of Classification Search
USPC ..... 702/152; 340/442, 445, 447; 356/139.03
See application file for complete search history.

(56) References Cited

U.S. PATENT DOCUMENTS

| | | | | |
|---|---|---|---|---|
| 3,069,654 | A * | 12/1962 | Hough | 382/281 |
| 5,296,909 | A * | 3/1994 | Fazi et al. | 356/4.01 |
| 7,397,548 | B2 * | 7/2008 | Filias et al. | 356/139.03 |
| 2002/0130792 | A1 * | 9/2002 | Schaefer | 340/945 |
| 2008/0007708 | A1 | 1/2008 | Filias et al. | |
| 2010/0010705 | A1 * | 1/2010 | Duddle et al. | 701/33 |

FOREIGN PATENT DOCUMENTS

| | | |
|---|---|---|
| FR | 2888944 A1 | 1/2007 |
| WO | 2007010113 A1 | 1/2007 |

OTHER PUBLICATIONS

C. Pschierer et al., High Integrity Databases for Helicopter Operations, Enhanced and Synthetic Vision 2009, Proc. of SPIE vol. 7328, 73280D, 2009 SPIE, CCC code: 0277-786X/09/$18, doi: 10/1117/12.818666.
Search Report and Written Opinion; Application No. FR 0905822 dated Aug. 5, 2010.
Pire, Richard et al., Digital Range Image Algorithms for Flight Guidance Aids for Helicopter-Low-Level-Flight; Annual Forum; 63rd Annual Forum Proceedings, May 1-3, 2007 Virginia Beach, Virginia; AHS International vol. 3; dated Jan. 1, 2007, pp. 1635-1641.

* cited by examiner

*Primary Examiner* — Carol S Tsai
(74) *Attorney, Agent, or Firm* — Brooks Kushman P.C.

(57) ABSTRACT

A method of detecting at least one suspended threadlike object by telemetry, the object lying in the detection field of a telemeter on board a vehicle. The method wherein in step iii), for each vertical plane taken into consideration, and for each set of at least four candidate points close to the vertical plane in question, using the least squares method to calculate the values of three parameters a, b, and c of a catenary having an equation of the form:

$$y = a \cos h[(x-b)/a] + c$$

the catenary containing the projections on the vertical plane of the points in the set under consideration; and determining that at least one suspended threadlike object is present as a function of the value of the correlation coefficient associated with said least squares method for all of the sets of at least four candidate points close to the vertical plane under consideration.

9 Claims, 2 Drawing Sheets

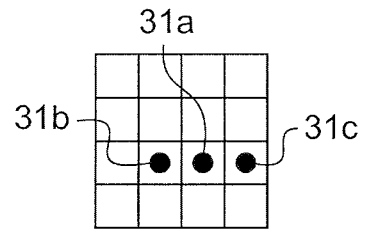
Fig.3a
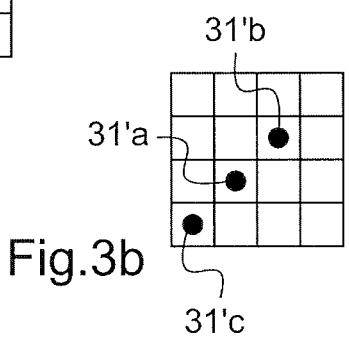
Fig.3b
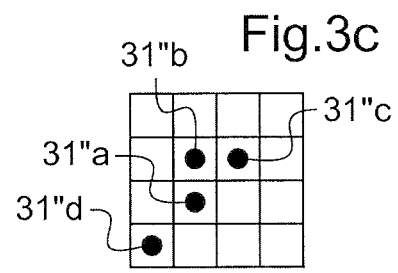
Fig.3c
Fig.4
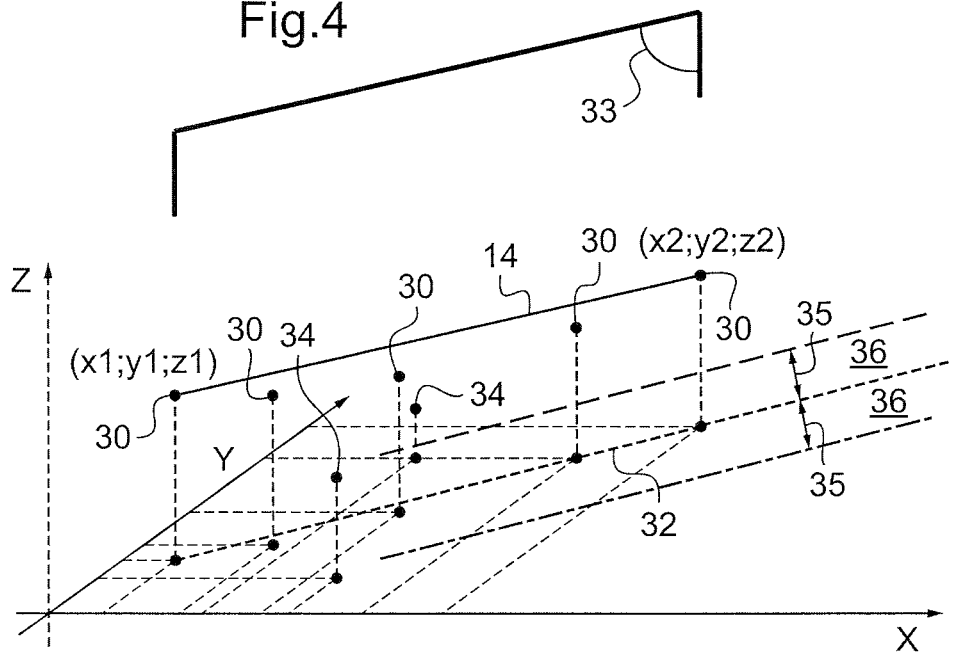

METHOD OF USING TELEMETRY TO DETECT AT LEAST ONE SUSPENDED THREADLIKE OBJECT, THE OBJECT LYING IN THE DETECTION FIELD OF A TELEMETER MOUNTED ON BOARD A VEHICLE

CROSS REFERENCE TO RELATED APPLICATIONS

This application claims the benefit of FR 09 05822 filed on Dec. 2, 2009. The disclosure of which is incorporated in its entirety by reference herein.

FIELD OF THE INVENTION

In general terms, the present invention relates to a method of using telemetry to detect at least one suspended threadlike object lying in the detection field of a telemeter mounted on board a vehicle.

More particularly, the method of the invention is associated with a LIDAR or RADAR type detector for detecting at least one suspended threadlike object that might constitute an obstacle for a moving vehicle.

A preferred, but non-limiting application of the invention, is associated with a detector device on board an aircraft.

Such a method, particularly when implemented on board an aircraft, must be capable of detecting suspended threadlike objects, e.g. cables, by telemetry in a manner that is sufficiently reliable and fast for the method to be suitable for being associated with an on-board detector device including a computer that can process the detected data as quickly as possible in order to deliver a detection signal in real time to a human or automatic pilot suitable for enabling the aircraft to avoid the detected suspended threadlike object(s).

BACKGROUND OF THE INVENTION

It is known that such a detector device is subject to detection errors due to individual false echoes. This can falsify the recognition of suspended threadlike objects. The number of detection errors must remain small in order to enable such a device to operate normally.

Document FR 2888944 describes a method of detecting the presence of at least one threadlike object suspended in the detection field of a telemeter including calculating the terrestrial coordinates of points corresponding to echoes delivered by the telemeter, selecting candidate points from amongst said points, searching in a horizontal plane for straight line segments that are close to vertical projections of the candidate points, and searching in each vertical plane containing one of the previously-found straight line segments for portions of catenaries that are close to the candidate points.

In that document, the search for catenary portions is performed using the Hough transform. Under certain circumstances, in particular when only a limited number of plots is available, the use of such a Hough transform does not lead to good processing time and the processing time needs to be shortened.

Document U.S. Pat. No. 3,069,654 describes the application of such a transform to recognizing a specific configuration within a cloud of points, e.g. a set of points that are in alignment. Once more, such a transform is unsuitable for being adapted to certain types of utilization, in particular when the number of points available is small.

The problem behind the present invention is to propose a method of detecting the presence of threadlike objects by processing telemetry measurements, which method is improved and/or remedies, at least in part, the shortcomings and the drawbacks of similar prior art methods.

SUMMARY OF THE INVENTION

To this end, the invention provides a method of detecting the presence of at least one threadlike object suspended in the detection field of a telemeter on board a vehicle, the method comprising the following steps:

i) calculating the terrestrial coordinates of points corresponding to echoes delivered by the telemeter and from these points selecting candidate points;

ii) in a horizontal plane, searching for straight line segments that are close to vertical projections of the candidate points; and iii) in each vertical plane containing a straight line segment found in step ii), searching for catenary portions that are close to the candidate points;

the method being characterized:

in step iii), for each vertical plane taken into consideration, and for each set of at least four candidate points close to the vertical plane in question, using the least squares method to calculate the values of three parameters a, b, and c of a catenary having an equation of the form:

$$y = a \cos h[(x-b)/a] + c$$

the catenary containing the projections on the vertical plane of the points in the set under consideration; and determining that at least one suspended threadlike object is present as a function of the value of the correlation coefficient associated with said least squares method for all of the sets of at least four candidate points close to the vertical plane under consideration.

Advantageously, in order to calculate the three parameters a, b, and c of the catenary, an initial calculation is performed of each of these parameters, and, after this initial calculation, a respective difference value as calculated using the least squares method is added to each of the calculated parameters in iterative manner.

Advantageously, during the initial calculation, the three parameters of the catenary are calculated using the following equations:

$$a = \sqrt{\frac{1+y'^2}{y''^2}}$$

$$c = y - (1+y'^2)/y''$$

$$b = x - a \cdot \text{Arc} \cos h[(y-c)/a]$$

y' and y'' being the first and second derivatives of the catenary.

Advantageously, after said initial calculation, any sets of at least four candidate points presenting a value corresponding to the parameter a that is less than or equal to zero are automatically eliminated for determining said catenary.

Advantageously, the first and second derivatives are calculated using the coordinates of three points of the set of at least four candidate points using the following equations:

$$y_n' = (y_n - y_{n-1})/(x_n - x_{n-1})$$

$$y_{n-1}' = (y_{n-1} - y_{n-2})/(x_{n-1} - x_{n-2})$$

$$y_n'' = (y_n' - y_{n-1}')/(x_{n-1} - x_{n-2})/2$$

Advantageously, the three closest-together points of said set are taken for calculating the first and second derivatives of y.

Advantageously, the respective difference values of the parameters a, b, and c are calculated from a first-order limited development of said catenary using the following equation:

$$y = a\cosh\left[\frac{x-b}{a}\right] +$$
$$c + \left[\cosh\left(\frac{x-b}{a}\right) - \left(\frac{x-b}{a}\right)\sinh\left(\frac{x-b}{a}\right)\right]\Delta a - \left[\sinh\left(\frac{x-b}{a}\right)\right]\Delta b + \Delta c$$

the parameters a, b, and c taking the values obtained during the initial calculation, and x,y presenting the respective coordinates of the four points of the set of at least four candidate points, thereby forming four equations for each set.

Advantageously, when the correlation coefficient defined by the least squares method is greater than a threshold value, the presently calculated catenary is validated.

Advantageously, during step i) prior to calculating the terrestrial coordinates of points corresponding to echoes delivered by the telemeter a grid is formed in a horizontal plane in the frame of reference of the telemeter, each mesh of the grid being capable of containing only one point, the candidate points being those that present a height greater than a predetermined altitude and presenting a number of neighbors in the meshes adjacent to their own mesh that is not greater than two.

Advantageously, the single point retained in a mesh is the point presenting the lowest altitude of the points received in said mesh.

In numerous circumstances, and in particular when the number of points is limited, determining a catenary from a set of at least four points by the least squares method has the technical result of processing speed that is faster than the processing speed obtained using the methods of the prior art. The processing for obtaining a catenary is thus less complicated than performing a Hough transform. This is particularly true for determining a catenary from a limited number of points.

BRIEF DESCRIPTION OF THE DRAWINGS

The invention is described below in greater detail and in non-limiting manner with reference to the accompanying figures, in which:

FIGS. 3*a* to 3*c* show examples of the distributions of plots illustrating a potential criterion for selecting one plot from some number of plots surrounding it; and FIG. 4 is a diagrammatic perspective view showing certain aspects of the method of detecting a catenary shape from a group of points in three dimensions.

DETAILED DESCRIPTION OF THE PREFERRED EMBODIMENTS

In order to detect threadlike objects, e.g. cables, in effective manner on board a vehicle, e.g. an aircraft, use is made of an active scanning sensor as a telemeter, in particular using light detection and ranging (LIDAR) for detection and telemetry using light or radio detection and ranging (RADAR) for detection and telemetry using radio. In known manner, these sensors acquire raw plots in spherical coordinates in terms of elevation, bearing, and range.

Unless specified to the contrary, the term "plot" is used below to designate a point corresponding to a measurement made by telemetry.

Using the components of the speed vector and the attitude data of the aircraft relating to roll, pitch, and geographical heading, which data may be provided for example by an inertial unit, it is possible for a computer on board the aircraft to calculate coordinates in a Cartesian frame of reference that is terrestrial, i.e. associated with the ground.

Figure 1:
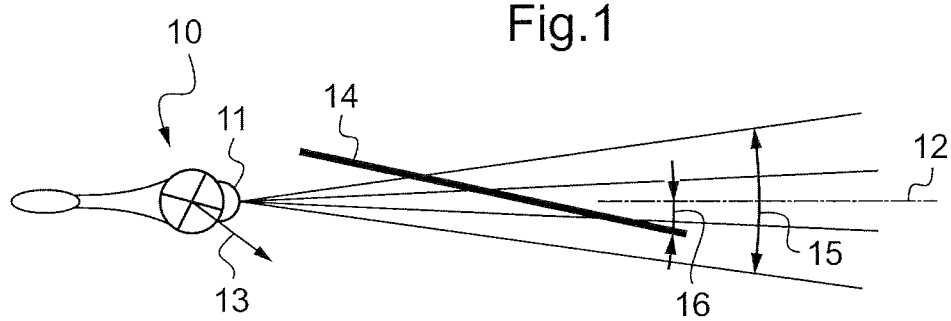
FIG. 1 is a diagrammatic plan view of a helicopter fitted with a telemeter scanning a sector of three-dimensional space that lies in front of the helicopter and in which a wire is suspended.

By way of illustration, in FIG. 1, a helicopter 10 is fitted with a LIDAR 11 scanning a sector of three-dimensional space that extends on either side of a line of sight 12.

In this figure, the helicopter 10 is moving along a vector 13. A threadlike object 14, in practice generally constituted by a cable, extends in part in the field 15 of the telemeter 11. Its trace extends in a horizontal plane in particular in the plane of FIG. 1 and forms a straight line segment sloping at a small sighting angle 16 relative to the line of sight 12 of the telemeter.

The number of echoes or measurement readings returned by a portion of the cable 14 to the telemeter 11 depends on the range between said portion of cable 14 and the telemeter 11. Furthermore, if the observation angle (or sighting angle or angle of incidence) is small, then the probability of echoes being returned by the cable 14 is also small.

Thus, depending on the angle of incidence of the telemeter 11 and depending on the range between the cable 14 and the helicopter 10, the number of echoes that are returned is highly variable. As a result, under certain conditions of angle and of range, cables 14 might not be detected, and are then not indicated to a human pilot or to an autopilot, for example.

The raw measurement plots acquired during one or more scans of the telemeter 11 are initially repositioned in a Cartesian frame of reference and subsequently processed by an algorithm in order to detect any portions of suspended cable 14 and indicate that they are present.

Figure 2:
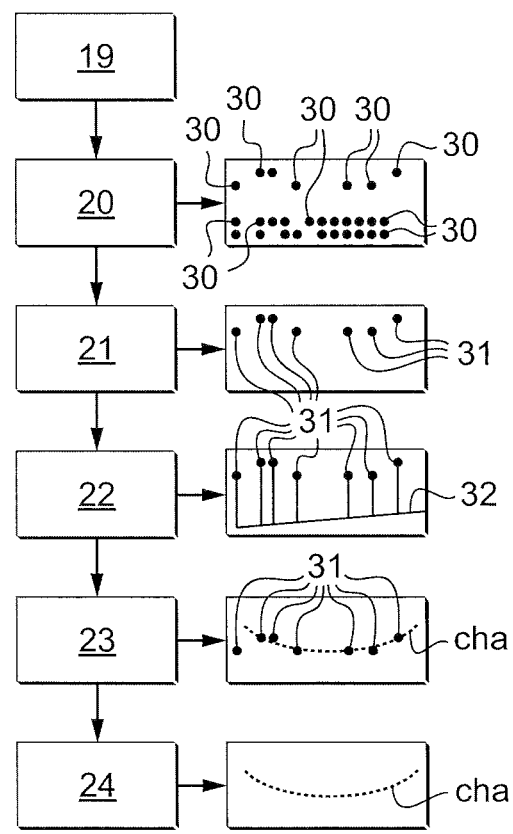
FIG. 2 is a diagram showing the main steps of the method of the present invention, together with the results obtained at the ends of said steps.

The detection method of the present invention comprises three successive main steps shown in FIG. 2.

The third step, which is essential for implementing the present invention, is initially described in general terms and is subsequently described in greater detail in the present description.

These steps are as follows:

i) step 19 represents the acquisition of plots by the telemeter, and step 20 represents the transformation of plots into plot points 30 in a frame of reference associated with the ground; and in step 21, from amongst the sets of plot points 30 obtained beforehand, candidate plot points 31 are selected or filtered for the purpose of detecting cables, which plot points may possibly be isolated;

ii) in step 22, from amongst the candidate plot points 31, "primitives" or "traces" 32 of suspended cables are detected on the horizontal plane, i.e. the x,y plane as shown in FIG. 3. This operation preferably makes use of a linear Hough transform so as to define straight line segments 32 that might be traces of cables; and iii) in step 23, a search is made in each vertical plane containing a straight line segment 32 found in step ii), for catenary portions cha that are close to the candidate plot points 31. Thereafter, in step 24, the catenary cha as recognized in this way is shown to the user. The manner in which the equation for this catenary cha is determined is explained in greater detail below.

During step i), it is possible to filter the candidate plot points 31 for the purpose of detecting cables in numerous ways.

When these plots are not situated on the ground, they may be selected by using a method based on surface coherence. The candidate plot points 31 are those that have no direct connection with the ground.

Filtering may also be performed "on the fly" by selecting candidate plots for detecting cables as and when raw plots are determined by the telemeter. This filtering may be performed on the distance between the plot under consideration and the preceding or following plots, said distance being compared with a certain predetermined value.

From the raw plots, it is also possible to calculate a digital model of minimum altitude elevation. The coordinates in the sensing frame of reference of each plot are converted into a local geographical frame of reference and each plot is positioned in a horizontal two-dimensional (2D) grid made up of individual meshes. Only the minimum altitude plots in each mesh are subsequently conserved.

The candidate plots that are retained are those that are situated at a height that is greater than the predetermined value of the minimum elevation model of the terrain. To give an idea, this value may be 10 meters (m).

This set of candidate plots may be accompanied by all of the plots having some number of neighbors that is less than a predetermined value for the number of neighbors in a grid in the frame of reference of the telemeter.

An example of such selection by number of neighbors is shown in FIGS. 3a to 3c. This selection may be implemented together with the above-described selection, or in isolation.

In FIGS. 3a to 3b, a candidate plot is selected when it has no more than two direct neighbors.

In FIG. 3a, candidate plot 31a for selection possesses two direct neighbors 31b and 31c in horizontal alignment therewith. This candidate plot 31a is accepted.

In FIG. 3b, candidate plot 31'a for selection possesses two direct neighbors 31'b and 31'c in alignment therewith on a diagonal. This candidate plot 31'a is accepted.

In FIG. 3c, candidate plot 31"a for selection possesses three direct neighbors 31"b, 31"c, and 31"d in its vicinity. This candidate plot 31"a is refused.

In step ii), in order to determine whether the candidate plot points as selected in this way are in alignment in projection, they are projected onto the horizontal plane (x,y) and it is verified whether straight line segments are obtained by using a two-dimensional linear Hough transform or a least-squares determination. For this particular step, the Hough transform is preferred, unlike the step of determining whether a catenary is present, which is preferably performed using the least-squares methods.

The Hough transform makes it possible, on the basis of their parameters, to recognize parametric geometrical shapes by varying the parameters of the looked-for equation as a function of the points encountered. This produces a dual space in which accumulation maxima correspond to the looked-for parameters of the looked-for shapes.

By adapting the Hough transform, and in order to put limits on the dual search space, it is preferable to use cylindrical coordinates. For each measurement point for which the projection on the horizontal plane has Cartesian coordinates (x,y) the following transformation is performed:

$$r = x\cos(\theta) + y\sin(\theta)$$

where $r>0$ and $\theta$ lying in the range 0 to $2\pi$.

Zones where accumulations are greatest correspond to straight lines in the (x,y) space.

By evaluating the most pertinent maxima in the $(r,\theta)$ space by calculating the accumulation values of the transform, straight line segments (x,y) are detected that correspond to cable traces on the ground.

In order to avoid detecting a plurality of cables as a single cable, the accumulation neighborhoods of the Hough transform may vary as a function of range: additional points may be distributed in density around a remote detected point.

FIG. 4 illustrates this determination.

Starting from the straight line(s) 32 found in (x,y) projection by accumulation in Hough space, it is possible to select additional points that are further away, e.g. points of coordinates (x1,y1) and (x2,y2) in the (x,y) plane that correspond to the detected straight line(s). For this purpose, it is possible to vary the range limit 35 for the additional points 34 to be selected relative to the straight line, as a function of the distance between said points and the vehicle on which the telemeter is mounted.

Thus, the further the plots are away from the vehicle, the wider the strip 36 projected on the ground in which a search is made for additional plots.

Given that a suspended threadlike object that is to be detected naturally takes on a catenary shape, e.g. because the object is in the form of a cable suspended between two points that are spaced apart from each other and that lie in a vertical plane, an important characteristic of the present invention is to associate the curvature taken by the object with the equation:

$$y = a\cosh\left(\frac{x-b}{a}\right) + c$$

with $a>0$.

Another important characteristic of the invention is that during step iii), a set of at least four points is taken for determining the parameters a, b, and c of the catenary as shown in the above equation.

This set is made up of points that are in alignment in projection on the horizontal plane, as mentioned above.

To label said sets of at least four points, the term "quadruplet" is used below since it corresponds to the general case, but it should not be forgotten that such sets might in fact be quintuplets, sextuplets, or sets containing even more points.

Nevertheless, it is advantageous to take only four points into account, and preferably points that are relatively close to one another, in order to facilitate real-time processing of telemetry data. In practice, the physics of detecting threadlike objects generally makes it possible only to detect points that are close together.

In accordance with an important characteristic of the present invention, during above-mentioned step iii) illustrated by step 23 in FIG. 2, the parameters a, b, and c of the above-mentioned catenary equation are determined by the least-squares method.

Similarly, the correlation coefficient is also determined by said method. When the correlation coefficient tends towards 1, the quadruplet is considered as forming a catenary and the threadlike object is recognized and identified by the calculated parameters a, b, and c.

As mentioned above, the suspended threadlike object for detection is in the form of a catenary that presents the following equation:

$$y = a\cosh\left(\frac{x-b}{a}\right) + c$$

with $a > 0$.

The first derivative of y is given by:

$$y' = \sinh\left[\frac{x-b}{a}\right]$$

The second derivative of y is given by:

$$y'' = \frac{1}{a}\cosh\left[\frac{x-b}{a}\right]$$

By inserting y and y' into the trignometrical identity:

$$\cosh^2\left[\frac{x-b}{a}\right] - \sinh^2\left[\frac{x-b}{a}\right] = 1$$

a first equation is obtained having a and c as unknowns:

$$\left[\frac{y-c}{a}\right]^2 - y'^2 = 1$$

By expressing y" as a function of y, the following is obtained:

$$y'' = \frac{1}{a}\cosh\left[\frac{x-b}{a}\right] = \frac{1}{a}\frac{y-c}{a}$$

A second equation can be deduced therefrom having a and c as unknowns:

$$a^2 = \frac{y-c}{y''}$$

By solving these two equations, the following are obtained:

$$c = y - (1+y'^2)/y''$$

$$a = \sqrt{\frac{1+y'^2}{y''^2}}$$

Concerning the constant b, it is calculated from the initial catenary equation:

$$y = a\cosh\left[\frac{x-b}{a}\right] + c \quad \Leftrightarrow$$

$$a\cosh\left[\frac{x-b}{a}\right] = y - c \quad \Leftrightarrow$$

$$\cosh\left[\frac{x-b}{a}\right] = (y-c)/a \quad \Leftrightarrow$$

$$\left[\frac{x-b}{a}\right] = \text{Arccosh}[(y-c)/a] \quad \Leftrightarrow$$

$$-b = a \cdot \text{Arccosh}[(y-c)/a] - x \quad \Leftrightarrow$$

$$b = x - a \cdot \text{Arccosh}[(y-c)/a]$$

Concerning y and its first and second derivatives y' and y", these are calculated for each set of points x, y, forming at least a quadruplet, as follows:

$$y_n' = (y_n - y_{n-1})/(x_n - x_{n-1})$$

$$y_{n-1}' = (y_{n-1} - y_{n-2})/(x_{n-1} - x_{n-2})$$

$$y_n'' = (y_n' - y_{n-1}')/(x_{n-1} - x_{n-2})/2$$

Three points $(x_n, y_n)$, $(x_{n-1}, y_{n-1})$, and $(x_{n-2}, y_{n-2})$ are thus necessary and sufficient for these calculations.

This produces three starting parameters $a_0$, $b_0$, and $c_0$.

Preferably, close-together points are taken from each quadruplet, illustrating said set of points, e.g. the three closest-together points of the quadruplet. Quadruplets associated with values for a that are less than or equal to zero are automatically eliminated.

This calculation of the three parameters a, b, and c uses the least squares method to determine the parameters a, b, and c associated with each quadruplet. The least squares method makes use of numerical solving by iteration initialized with the starting values $a_0$, $b_0$, and $c_0$.

For successive iterations, use is made of a first order limited development of the formula:

$$y = a\cosh\left(\frac{x-b}{a}\right) + c$$

about the solution a, b, and c obtained with a quadruplet of points.

$$y = a\cosh\left[\frac{x-b}{a}\right] + c + \left[\cosh\left(\frac{x-b}{a}\right) - \left(\frac{x-b}{a}\right)\sinh\left(\frac{x-b}{a}\right)\right]\Delta a - \left[\sinh\left(\frac{x-b}{a}\right)\right]\Delta b + \Delta c$$

There are three unknowns $\Delta a$, $\Delta b$, and $\Delta c$, forming respective differences from a, b, and c. These are calculated in application of the least squares methods as applies to the system of four equations formed with each quadruplet.

The iterative method thus makes it possible to search for three parameters that provide the "best" match to four equations.

Three new parameters $a_1$, $b_1$, and $c_1$ for the catenary are then determined using the following equations:

$$a_1 = a_0 + \Delta a$$

$$b_1 = b_0 + \Delta b$$

$$c_1 = c_0 + \Delta c$$

This is valid on each iteration for each quadruplet of points x,y with a correlation or quality coefficient.

When the correlation coefficient obtained from a certain iteration is greater than a certain threshold value selected to be close to 1, the catenary is validated and its parameters are stored in memory. This threshold value is a function of the inaccuracy of the raw plots and is found by successive approximations and full-scale testing.

This is how the step of validating the catenary is performed in accordance with the method of the present invention.

This validation for detecting threadlike objects requires the step of at least four points forming a catenary. The algorithm on which the method is based is faster than those of the prior art for a limited number of candidate plots, which is its preferred condition of use.

When this algorithm is used for a larger number of plots, it is advantageous to select candidate plots appropriately by taking account only of quadruplets of close-together plots.

This algorithm is suitable for a real time on-board application and it serves to mitigate the positioning inaccuracy of the raw plots.

What is claimed is:

1. A method of detecting the presence of at least one threadlike object suspended in the detection field of a telemeter on board a vehicle, the method comprising the following steps of mounting the telemeter on board the vehicle, and:
  i) calculating the terrestrial coordinates (x, y, z) of points corresponding to echoes delivered by the telemeter and selecting candidate points from the points;
  ii) searching in a horizontal plane for straight line segments that are close to vertical projections of the candidate points; and
  iii) searching in each vertical plane containing a straight line segment found in step ii) for catenary portions that are close to the candidate points;
  wherein in step iii), for each vertical plane under consideration, and for each set of at least four candidate points close to the vertical plane under consideration, using the least squares method to calculate the values of three parameters a, b, and c of a catenary having an equation of the form:

$$y = a \cos h[(x-b)/a] + c$$

the catenary containing the projections on the vertical plane of the points in the set under consideration; and
    determining that at least one suspended threadlike object is present as a function of the value of the correlation coefficient associated with the least squares method for all of the sets of at least four candidate points close to the vertical plane under consideration, wherein in order to calculate the three parameters a, b, and c of the catenary, an initial calculation is performed of each of these parameters, and wherein, after this initial calculation, a respective difference value as calculated using the least squares method is added to each of the calculated parameters in an iterative manner.

2. The method according to claim 1, wherein during the initial calculation, the three parameters of the catenary are calculated using the following equations:

$$a = \sqrt{\frac{1+y'^2}{y''^2}}$$

$$c = y - (1+y'^2)/y''$$

$$b = x - a \cdot \text{Arc} \cos h[(y-c)/a]$$

y' and y" being the first and second derivatives of the catenary.

3. The method according to claim 2, wherein, after the initial calculation, any sets of at least four candidate points presenting, a value corresponding to the parameter a that is less than or equal to zero are automatically eliminated for determining the catenary.

4. The method according to claim 2, wherein the first and second derivatives are calculated using the coordinates of three points of the set of at least four candidate points using the following equations:

$$y_n' = (y_n - y_{n-1})/(x_n - x_{n-1})$$

$$y_{n-1}' = (y_{n-1} - y_{n-2})/(x_{n-1} - x_{n-2})$$

$$y_n'' = (y_n' - y_{n-1}')/(x_{n-1} - x_{n-2})/2.$$

5. The method according to claim 4, wherein the three closest-together points of the set are taken for calculating the first and second derivatives of y.

6. The method according to claim 1, wherein the respective difference values of the parameters a, b, and c are calculated from a first-order limited development of said catenary using the following equation:

$$y = a \cosh\left[\frac{x-b}{a}\right] + c + \left[\cosh\left(\frac{x-b}{a}\right) - \left(\frac{x-b}{a}\right)\sinh\left(\frac{x-b}{a}\right)\right]\Delta a - \left[\sinh\left(\frac{x-b}{a}\right)\right]\Delta b + \Delta c$$

the parameters a, b, and c taking the values obtained during the initial calculation, and x, y presenting the respective coordinates of the four points of the set of at least four candidate points to form four equations for each set.

7. A method of detecting the presence of at least one threadlike object suspended in the detection field of a telemeter on board a vehicle, the method comprising the following steps of mounting the telemeter on board the vehicle, and:
  i) calculating the terrestrial coordinates (x, y, z) of points corresponding to echoes delivered by the telemeter and selecting candidate points from the points;
  ii) searching in a horizontal plane for straight line segments that are close to vertical projections of the candidate points; and
  iii) searching in each vertical plane containing a straight line segment found in step ii) for catenary portions that are close to the candidate points;
  wherein in step iii), for each vertical plane under consideration, and for each set of at least four candidate points close to the vertical plane under consideration, using the least squares method to calculate the values of three parameters a, b, and c of a catenary having an equation of the form:

$$y = a \cos h[(x-b)/a] + c$$

the catenary containing the projections on the vertical plane of the points in the set under consideration; and
    determining that at least one suspended threadlike object is present as a function of the value of the correlation coefficient associated with the least squares method for all of the sets of at least four candidate points close to the vertical plane under consideration, wherein when the correlation coefficient defined by the least square method is greater than a threshold value, the presently calculated catenary is validated.

8. A method of detecting the presence of at least one threadlike object suspended in the detection field of a telemeter on board a vehicle, the method comprising the following steps of mounting the telemeter on board the vehicle, and:

i) calculating the terrestrial coordinates (x, y, z) of points corresponding to echoes delivered by the telemeter and selecting candidate points from the points;

ii) searching in a horizontal plane for straight line segments that are close to vertical projections of the candidate points; and iii) searching in each vertical plane containing a straight line segment found in step ii) for catenary portions that are close to the candidate points;

wherein in step iii), for each vertical plane under consideration, and for each set of at least four candidate points close to the vertical plane under consideration, using the least squares method to calculate the values of three parameters a, b, and c of a catenary having an equation of the form:

$$y = a \cos h[(x-b)/a] + c$$

the catenary containing the projections on the vertical plane of the points in the set under consideration; and determining that at least one suspended threadlike object is present as a function of the value of the correlation coefficient associated with the least squares method for all of the sets of at least four candidate points close to the vertical plane under consideration, wherein during step i), prior to calculating the terrestrial coordinates of the points corresponding to the echoes delivered by the telemeter, a grid is formed in a horizontal plane in the frame of reference of the telemeter, each mesh of the grid being capable of containing only one point, the candidate points being those that present a height greater than a predetermined altitude and presenting a number of neighbors in the meshes adjacent to their own mesh that is not greater than two.

9. The method according to claim 8, wherein the single point retained in a mesh is the point presenting the lowest altitude of the points received in the mesh.

* * * * *